United States Patent [19]
Chang

[11] Patent Number: 5,924,315
[45] Date of Patent: Jul. 20, 1999

[54] TWO-PURPOSE STEERING WHEEL LOCK

[76] Inventor: Li-Lin Chang, No. 5, Lane 76, Hsin-Ming St., Tamshui Town, Taipei Hsien, Taiwan

[21] Appl. No.: 09/046,730

[22] Filed: Mar. 24, 1998

[51] Int. Cl.⁶ .................................................. B60R 25/02
[52] U.S. Cl. .................................. 70/209; 70/226; 70/212
[58] Field of Search ............................. 70/209, 211, 212, 70/226, 225, 237, 238, 233

[56] References Cited

U.S. PATENT DOCUMENTS

| | | | |
|---|---|---|---|
| 1,361,264 | 12/1920 | Kaercher | 70/212 |
| 4,674,306 | 6/1987 | Halpern | 70/233 |
| 5,007,259 | 4/1991 | Mellard | 70/226 |
| 5,253,497 | 10/1993 | Hsieh | 70/226 |
| 5,297,406 | 3/1994 | Lin | 70/209 |
| 5,375,441 | 12/1994 | Liou | 70/226 |
| 5,400,627 | 3/1995 | Liao | 70/237 |
| 5,426,960 | 6/1995 | Jan | 70/209 |
| 5,426,962 | 6/1995 | Kuo | 70/211 |
| 5,452,597 | 9/1995 | Chen | 70/226 |
| 5,456,242 | 10/1995 | Su | 70/237 |
| 5,613,387 | 3/1997 | Shieh | 70/233 |
| 5,671,620 | 9/1997 | Carvey et al. | 70/209 |

*Primary Examiner*—Darnell M. Boucher
*Attorney, Agent, or Firm*—Rosenberg, Klein & Bilker

[57] ABSTRACT

A steering wheel lock including a lock body, a U-shaped shackle bar mounted on the lock body for securing to the lock body to the rim of the steering wheel to be locked, a hook bar integral with the lock body for hooking on the rim of the steering wheel, and a polygonal stop bar fixed to the lock body for stopping at a fixed location inside the motor vehicle, the polygonal stop bar having square drive ends at both ends for use as L-shaped wrench means for turning bolts and nuts by means of sockets.

7 Claims, 4 Drawing Sheets

ID=5,924,315

TWO-PURPOSE STEERING WHEEL LOCK

BACKGROUND OF THE INVENTION

The present invention relates to a steering wheel lock, and more particularly to such a steering wheel lock which can also be used as spanner means for dismounting motor vehicle wheel tires.

A variety of steering wheel locks have been disclosed for locking the steering wheel of a motor vehicle, and have appeared on the market. Conventional steering wheel locks are simply designed for locking the steering wheel of a motor vehicle. When they are removed from the steering wheel, they cannot be used for any other purpose.

SUMMARY OF THE INVENTION

It is one object of the present invention to provide a steering wheel lock which can positively lock the steering wheel of any of a variety of motor vehicles. It is another object of the present invention to provide a steering wheel lock which can be used as L-shaped wrench means for dismounting motor vehicle wheel tires when it is removed from the steering wheel. To achieve these and other objects of the present invention, there is provided a steering wheel lock comprised of a lock body, the lock body comprising a barrel horizontally disposed at one side, the barrel defining a polygonal through hole, a lock cylinder vertically disposed at an opposite side, a locating block integral with the periphery of the lock cylinder, the locating block defining a vertical lock hole, a recessed portion defined between the barrel and the lock cylinder for receiving the rim of a steering wheel of a motor vehicle, and a cylindrical shell embedded in a transverse hole in the barrel and defining a vertical lock hole in communication with the polygonal through hole on the barrel; a U-shaped shackle bar fastened to the lock hole on the cylindrical shell and the lock hole on the locating block to secure the lock body to the rim of the steering wheel, the U-shaped shackle bar having a fixed end revolvably inserted into the lock hole on the cylindrical shell and moved vertically therein and secured thereto by locating means, and a free end for insertion into the lock hole on the locating block, the free end having a plurality of vertically spaced annular grooves around the periphery for locking in the lock hole on the locating block by the lock cylinder; and an angled polygonal stop bar having one end mounted in the polygonal through hole on the barrel and an opposite end extended out of the lock body at a distance for stopping at a fixed location inside the motor vehicle, the angled polygonal stop bar having two square drive ends at two opposite ends thereof for use as L-shaped wrench means.

DETAILED DESCRIPTION OF THE PREFERRED EMBODIMENT

Figure 1:
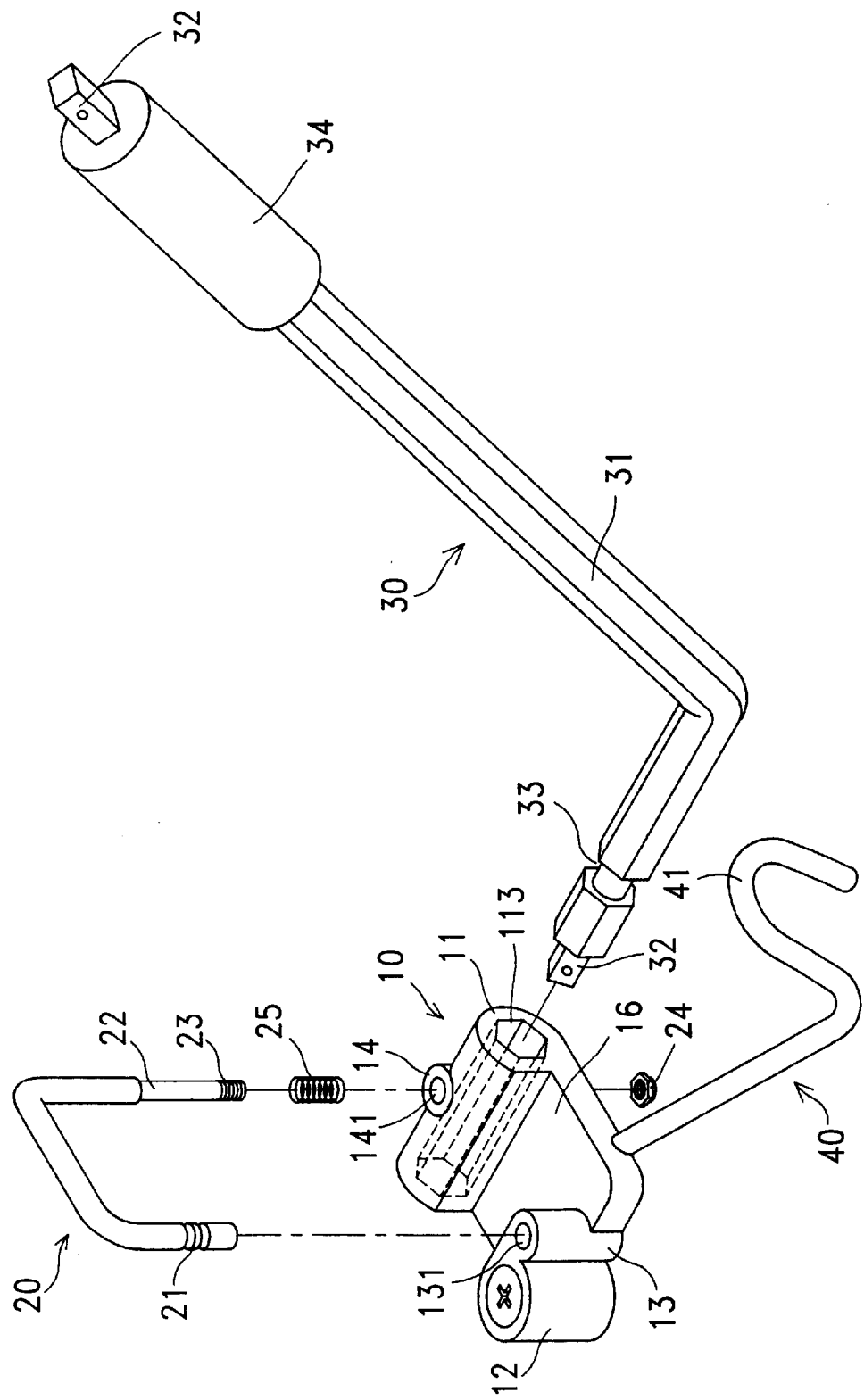
FIG. 1 is an exploded view of a steering wheel lock according to the present invention.
Figure 2:
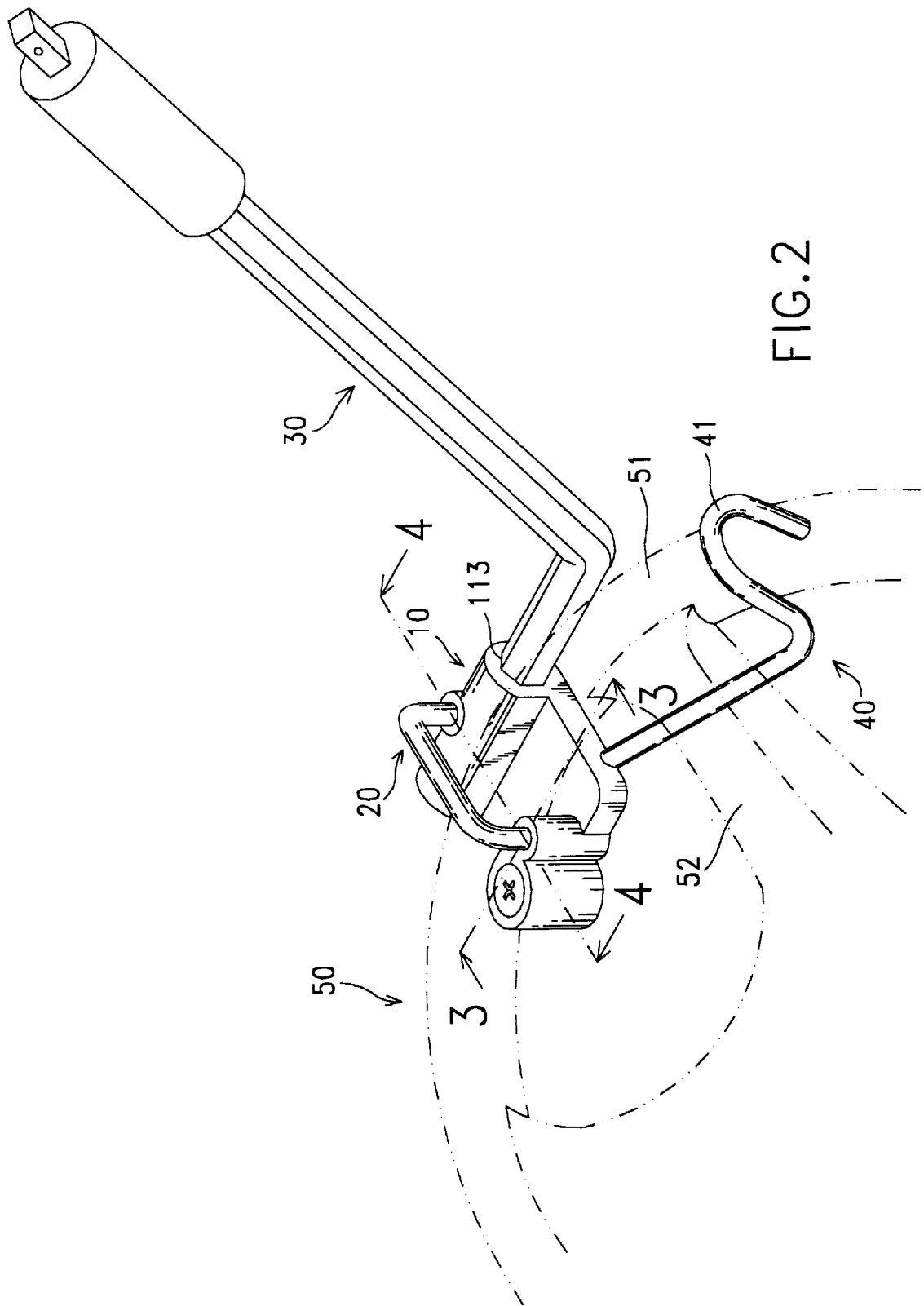
FIG. 2 is a perspective view of the present invention showing the steering wheel lock installed in a steering wheel.

Referring to FIGS. 1 and 2, a steering wheel lock in accordance with the present invention is generally comprised of a lock body 10, a U-shaped shackle bar 20, a hook bar 40, and an angled stop bar 30.

The lock body 10 comprises a barrel 11 horizontally disposed at one side, a lock cylinder 12 vertically disposed at an opposite side, a locating block 13 integral with the periphery of the lock cylinder 12, and a recessed portion 16 defined between the barrel 11 and the lock cylinder 12. The locating block 13 defines a vertical lock hole 131. A cylindrical shell 14 is embedded in the barrel 11 and disposed perpendicular to the lock body 10. The cylindrical shell 14 defines a vertical lock hole 141.

The U-shaped shackle bar 20 comprises an extension rod 22 at one end namely the fixed end, and a plurality of vertically spaced annular grooves 21 made around the periphery at an opposite end namely the free end. The extension rod 22 has a threaded tip 23. The extension rod 22 of the U-shaped shackle bar 20 is inserted through a coil spring 25 in the lock hole 141, and then secured in place by threading a nut 24 onto the threaded tip 23. When installed, the U-shaped shackle bar 20 can be rotated in the lock hole 141 on the cylindrical shell 14, permitting the free end of the U-shaped shackle bar 20 to be moved into vertical alignment with the lock hole 131 on the locating block 13, or away from the lock hole 131. When the lock body 10 is attached to the steering wheel 50 at the bottom side, the U-shaped shackle bar 20 is bridged over the periphery of the steering wheel 50, and the free end of the U-shaped shackle bar 20 is inserted into the lock hole 131 on the locating block 13 and locked by the lock cylinder 12.

The hook bar 40 is integral with the lock body 10, having a hooked end 41 for hooking on the periphery of the steering wheel 50.

The barrel 11 defines a polygonal through hole 113 for receiving the angled stop bar 30. The angled stop bar 30 comprises a polygonal bar body 31, two square drive ends 32 at two opposite ends of the polygonal bar body 31, a handhold 34 at one end between the polygonal bar body 31 and one square drive end 32, and a neck 33 at the polygonal bar body 31 adjacent to one square drive end 32 remote from the handhold 34.

Figure 3:
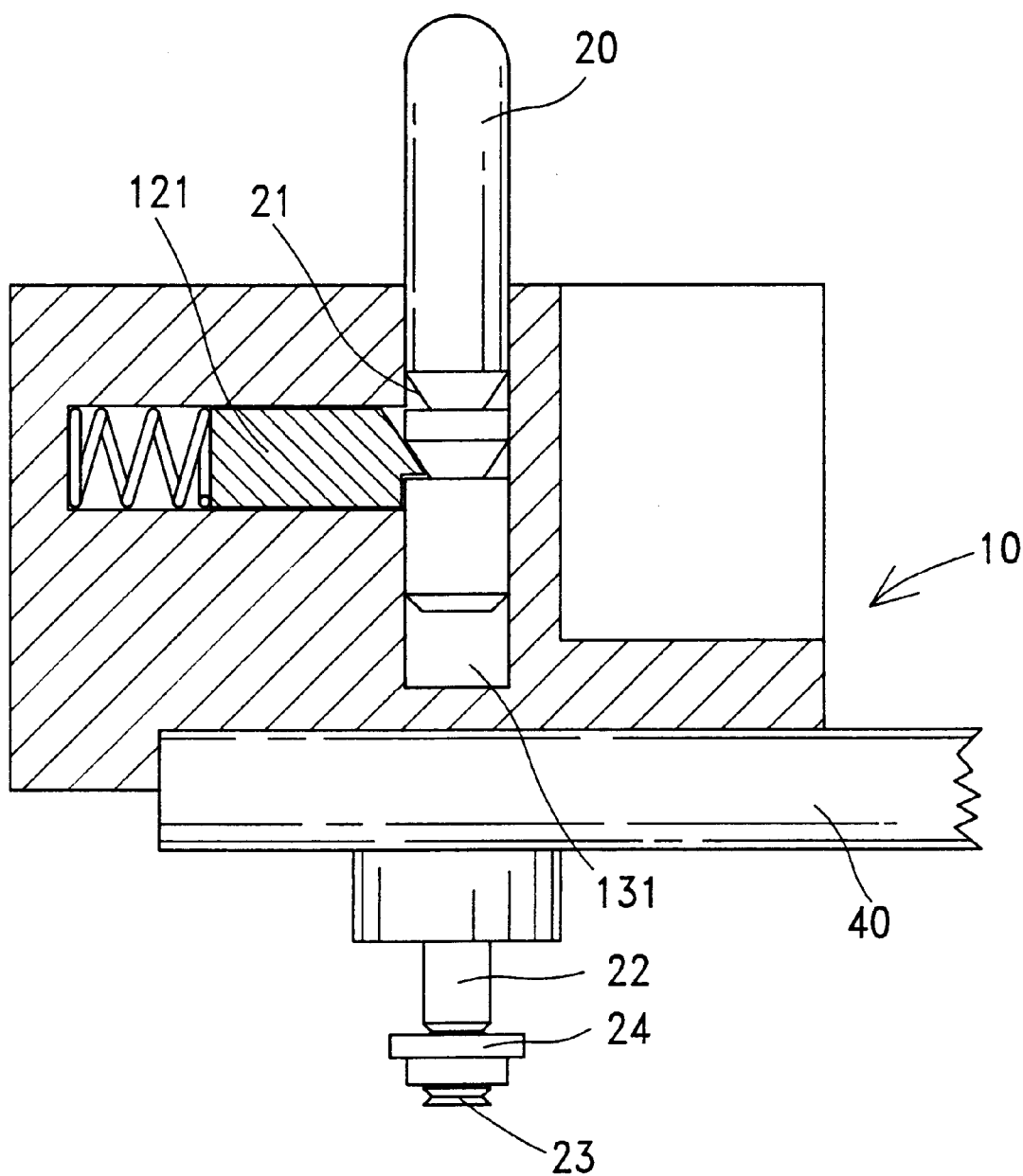
FIG. 3 is a sectional view in an enlarged scale taken along line 3—3 of FIG. 2.
Figure 4:
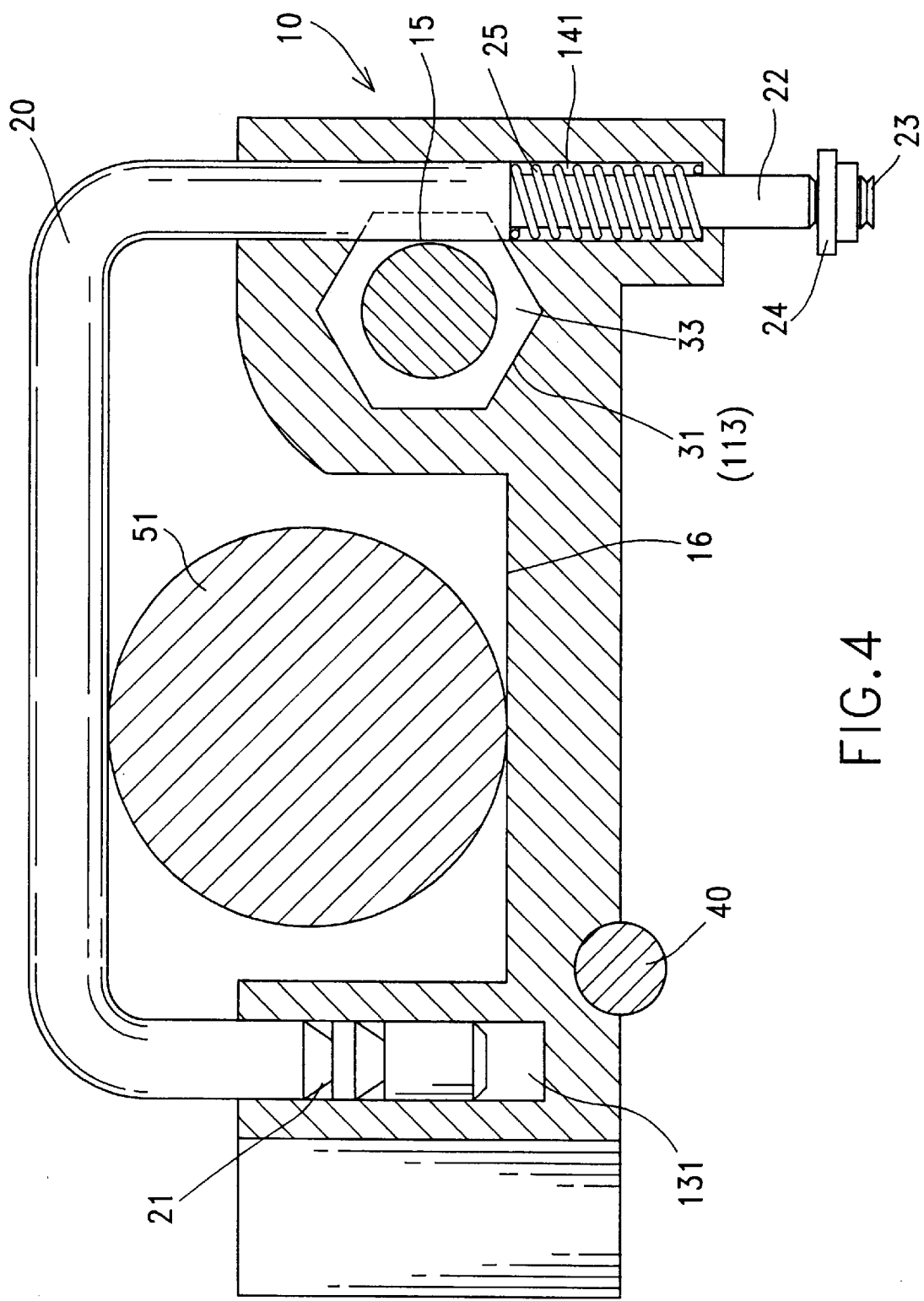
FIG. 4 is a sectional view in an enlarged scale taken along line 4—4 of FIG. 2.

Referring to FIGS. 3 and 4 and FIGS. 1 and 2 again, when in use, the polygonal bar body 31 of the angled stop bar 30 is inserted into the polygonal through hole 113 on the barrel 11, permitting the neck 33 of the polygonal bar body 31 to be moved to a gap 15 in between the polygonal through hole 113 and the lock hole 141 on the cylindrical shell 14 and forced into engagement with the U-shaped shackle bar 20, then the lock body 10 is closely attached to the periphery of the steering wheel 50, permitting the rim 51 of the steering wheel 50 to be received in the recessed portion 16 between the barrel 11 and the lock cylinder 12 and the hooked end 41 of the hook bar 40 to be hooked on the rim 51 of the steering wheel 50, and then the free end of the U-shaped shackle bar 20 is inserted into the lock hole 131 on the locating block 13, enabling one annular groove 21 to be forced into engagement with a spring latch 121 in the lock cylinder 12. When installed, the angled stop bar 30 is stopped at a fixed location inside the motor vehicle to stop the steering wheel 50 from rotation.

Further, the angled stop bar 30 can be used as a wrench for turning bolts and nuts by attaching a socket to one square drive end 32 thereof.

While only one embodiment of the present invention has been shown and described, it will be understood that various modifications and changes could be made thereunto without departing from the spirit and scope of the invention disclosed.

What the invention claimed is:

1. A steering wheel lock comprising:

a lock body, said lock body comprising a barrel horizontally disposed at one side, said barrel defining a polygonal through hole, a lock cylinder vertically disposed at an opposite side, a locating block integral with the periphery of said lock cylinder, said locating block defining a vertical lock hole, a recessed portion defined between said barrel and said lock cylinder for receiving the rim of a steering wheel of a motor vehicle, and a cylindrical shell embedded in a transverse hole in said barrel and defining a vertical lock hole in communication with the polygonal through hole on said barrel;

a U-shaped shackle bar fastened to the lock hole on said cylindrical shell and the lock hole on said locating block to secure said lock body to the rim of the steering wheel, said U-shaped shackle bar having a fixed end revolvably inserted into the lock hole on said cylindrical shell and moved vertically therein and secured thereto by locating means, and a free end for insertion into the lock hole on said locating block, said free end having a plurality of vertically spaced annular grooves around the periphery for locking in the lock hole on said locating block by said lock cylinder; and an angled polygonal stop bar having one end mounted in the polygonal through hole on said barrel and an opposite end extended out of said lock body at a distance for stopping at a fixed location inside the motor vehicle, said angled polygonal stop bar having two square drive ends at two opposite ends thereof for use as L-shaped wrench means.

2. The steering wheel lock of claim 1, further comprising a hook bar, said hook have having one end integral with said lock body, and an opposite end terminating in a hooked tip for hooking on the rim of the steering wheel.

3. The steering wheel lock of claim 1, wherein the fixed end of said U-shaped shackle bar comprises an extension rod inserted through the lock hole on said cylindrical shell, said extension rod having a threaded tip extending out of the lock hole on said cylindrical shell and screwed up with a nut out said lock body.

4. The steering wheel lock of claim 3, wherein a coil spring is mounted around the extension rod of said U-shaped shackle bar inside the lock hole on said cylindrical shell, said coil spring imparting an upward pressure to said U-shaped shackle bar.

5. The steering wheel lock of claim 1, wherein said lock cylinder comprises a spring latch for engaging into one annular groove on the free end of said U-shaped shackle bar to fix the free end of said U-shaped shackle bar in the lock hole on said locating block.

6. The steering wheel lock of claim 1, wherein said angled polygonal stop bar has a neck near one end inserted into the polygonal through hole on said barrel and retained in place by the fixed end of said U-shaped shackle bar.

7. The steering wheel lock of claim 1, wherein said angled polygonal stop bar has a handhold at one end.

* * * * *